(12) United States Patent
Lin

(10) Patent No.: US 12,106,746 B2
(45) Date of Patent: Oct. 1, 2024

(54) AUDIO SYNTHESIS METHOD AND APPARATUS, COMPUTER READABLE MEDIUM, AND ELECTRONIC DEVICE

(71) Applicant: Tencent Technology (Shenzhen) Company Limited, Shenzhen (CN)

(72) Inventor: Shilun Lin, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 283 days.

(21) Appl. No.: 17/703,136

(22) Filed: Mar. 24, 2022

(65) Prior Publication Data
US 2022/0215827 A1  Jul. 7, 2022

Related U.S. Application Data

(63) Continuation of application No. PCT/CN2021/085862, filed on Apr. 8, 2021.

(30) Foreign Application Priority Data

May 13, 2020  (CN) .......................... 202010402599.7

(51) Int. Cl.
*G10L 13/08* (2013.01)
*G06F 40/126* (2020.01)
(Continued)

(52) U.S. Cl.
CPC ............ *G10L 13/08* (2013.01); *G06F 40/126* (2020.01); *G06F 40/30* (2020.01); *G10L 13/033* (2013.01)

(58) Field of Classification Search
CPC ..... G10L 13/08; G10L 13/033; G10L 13/086; G10L 13/02; G06F 40/126; G06F 40/30; G06F 40/263
See application file for complete search history.

(56) References Cited

U.S. PATENT DOCUMENTS

2020/0082806 A1* 3/2020 Kim .......................... G06N 3/04

FOREIGN PATENT DOCUMENTS

| CN | 107481713 A | 12/2017 |
|---|---|---|
| CN | 109697974 A | 4/2019 |

(Continued)

OTHER PUBLICATIONS

CN109767755A_MT (Year: 2019).*

(Continued)

*Primary Examiner* — Bhavesh M Mehta
*Assistant Examiner* — Darioush Agahi
(74) *Attorney, Agent, or Firm* — Banner & Witcoff, Ltd.

(57) ABSTRACT

This application discloses a method, an apparatus, a computer readable medium, and an electronic device for audio synthesis. The method includes: acquiring mixed language text information comprising text characters corresponding to at least two language types; performing text coding processing on the mixed language text information based on the at least two language types, to obtain an intermediate semantic coding feature of the mixed language text information; acquiring a target tone feature corresponding to a target tone subject, and performing decoding processing on the intermediate semantic coding feature based on the target tone feature to obtain an acoustic feature; and performing acoustic coding processing on the acoustic feature to obtain an audio corresponding to the mixed language text information.

16 Claims, 5 Drawing Sheets

(51) Int. Cl.
  *G06F 40/30* (2020.01)
  *G10L 13/033* (2013.01)

(56) References Cited

FOREIGN PATENT DOCUMENTS

| | | | | |
|---|---|---|---|---|
| CN | 109767755 A | * | 5/2019 | |
| CN | 111128114 A | | 5/2020 | |
| CN | 111145720 A | * | 5/2020 | ............. G10L 13/02 |
| CN | 111247581 A | | 6/2020 | |
| JP | H09244679 A | | 9/1997 | |
| WO | WO-2021127817 A1 | * | 7/2021 | ............. G10L 13/02 |

OTHER PUBLICATIONS

CN111145720A_MT (Year: 2020).*
WO2021127817A1,CN_MT (Year: 2019).*
Cao et al. "End-to-End Code-Switched TTS With Mix of Monolingual Recordings", ICASSP 2019 (Year: 2019).*
Nachmani et al., ("Unsupervised Polyglot Text-to-Speech"), Facebook AI research 2019/IEEE, ICASSP (Year: 2019).*
Wu et al. "End-to-End Emotional Speech Synthesis Using Style Tokens and Semi-Supervised Training", Proceedings of APSIPA Annual Summit and Conference 2019, Nov. 18-21, 2019, Lanzhou, China (Year: 2019).*
International Search Report and Written Opinion with English Translation for International Patent Application No. PCT/CN2021/085862 dated Jun. 29, 2021, 14 pages.

* cited by examiner

AUDIO SYNTHESIS METHOD AND APPARATUS, COMPUTER READABLE MEDIUM, AND ELECTRONIC DEVICE

RELATED APPLICATION

This application is a continuation application of PCT Patent Application No. PCT/CN2021/085862, filed on Apr. 8, 2021, which claims priority to Chinese Patent Application No. 202010402599.7, filed with the China National Intellectual Property Administration on May 13, 2020, each of which is incorporated herein by reference in its entirety.

FIELD OF THE TECHNOLOGY

This application relates to the field of artificial intelligence technologies, and specifically, to an audio synthesis technology.

BACKGROUND OF THE DISCLOSURE

With rapid development of artificial intelligence technologies and intelligent hardware devices (for example, a smartphone or a smart box), a voice interaction technology is increasingly applied as a natural interaction manner. As an important link in the voice interaction technology, the voice synthesis technology has also made great progress. The voice synthesis technology is also referred to as a text to speech (TTS) technology, and is to transform text information generated by a computer itself or entered externally into fluent voice that can be understood by a user, and play it.

In an application of the voice synthesis technology, a case of speech mixing of multiple language types is often encountered, for example, an English word or an English phrase is included in a Chinese sentence. In this case, a large tone difference usually occurs when speeches of the two language types are switched, which causes obvious tone jump of the synthesized speech and affects the playback effect of the synthesized speech. Therefore, how to overcome a tone difference caused by mixing speeches of multiple language types is an urgent problem to be solved at present.

SUMMARY

This application aims to provide an audio synthesis method, an audio synthesis apparatus, a computer readable medium, and an electronic device, so as to resolve, to a certain extent, a technical problem of a tone difference caused by different language types in a synthesized audio.

Other features and advantages of this application will be apparent from the following detailed description, or may be acquired in part by practice of this application.

According to an aspect of an embodiment of this disclosure, an audio synthesis method is provided, and is performed by an electronic device, and the method includes:
  acquiring mixed language text information, the mixed language text information including text characters corresponding to at least two language types;
  performing text coding processing on the mixed language text information based on the at least two language types, to obtain an intermediate semantic coding feature of the mixed language text information;
  acquiring a target tone feature corresponding to a target tone subject, and performing decoding processing on the intermediate semantic coding feature based on the target tone feature to obtain an acoustic feature; and
  performing acoustic coding processing on the acoustic feature to obtain an audio corresponding to the mixed language text information.

According to an aspect of an embodiment of this disclosure, an audio synthesis apparatus is provided, and the apparatus includes:
  an information acquiring module, configured to acquire mixed language text information, the mixed language text information including text characters corresponding to at least two language types;
  an information coding module, configured to perform text coding processing on the mixed language text information based on the at least two language types, to obtain an intermediate semantic coding feature of the mixed language text information;
  an information decoding module, configured to: acquire a target tone feature corresponding to a target tone subject, and perform decoding processing on the intermediate semantic coding feature based on the target tone feature to obtain an acoustic feature; and
  an acoustic coding module, configured to perform acoustic coding processing on the acoustic feature to obtain an audio corresponding to the mixed language text information.

According to an aspect of an embodiment of this disclosure, an electronic device is provided, and the electronic device includes a processor; and a memory, configured to store executable instructions of the processor; the processor being configured to perform the audio synthesis method in the foregoing technical solution by executing the executable instructions.

According to an aspect of an embodiment of this disclosure, a computer program product is provided, including instructions, when run on a computer, causing the computer to perform the audio synthesis method in the foregoing technical solution.

According to an aspect of an embodiment of this disclosure, a non-transitory computer-readable medium is provided, storing computer instructions, when executed by one or more processors, causing the processors to perform the audio synthesis method in the foregoing technical solution.

In the technical solution provided in the embodiments of this disclosure, coding processing is performed on mixed language text information by using encoders corresponding to multiple language types, and then decoding processing is performed on coding features by using decoders that combine a tone feature of a target tone subject, so as to implement transform to generate audio information corresponding to a single tone and multiple language types. This solves a problem of tone jump due to a language difference in an existing mixed language audio synthesis technology, and can stably output a natural, smooth and tone-unified mixed language audio. The embodiments of this disclosure may be deployed in the cloud to provide a common audio synthesis service for various devices, or may be customized according to different application requirements. Single language audio databases of different target tone subjects may be used for implementing mixed synthesis of audios of multiple language types, thereby greatly reducing costs of training data collection. In addition, the embodiments of this disclosure can be compatible with a recorded single language audio database, so that available tones are more abundant.

DESCRIPTION OF EMBODIMENTS

Application scenarios of this application are extensive, and an audio synthesis solution in which multiple language types are mixed may be configured as a cloud service. As a basic technology, the audio synthesis solution can be used for a user who uses the cloud service, or the solution may be used for a personalized scenario in a vertical field. For example, the solution may be applied to scenarios such as intelligent reading of a read APP, intelligent customer service, news broadcast, and intelligent device interaction, so as to implement intelligent audio synthesis in various scenarios.

Figure 1:
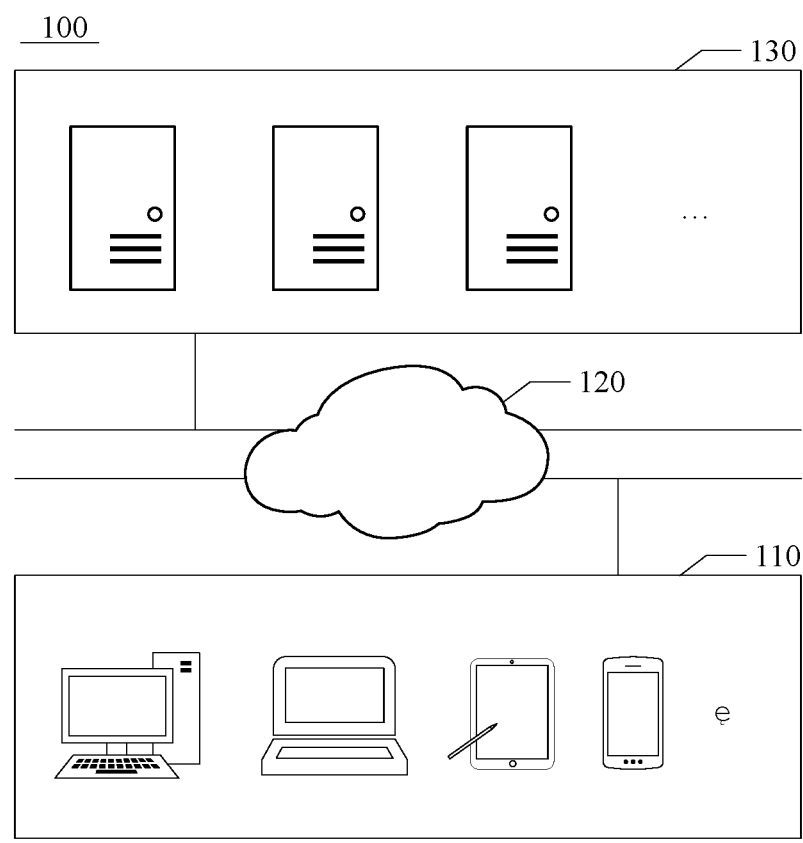
FIG. 1 is a schematic diagram of an example system architecture of a technical solution according to this application in an application scenario.

FIG. 1 is a schematic diagram of an example system architecture of a technical solution according to this application in an application scenario.

As shown in FIG. 1, a system architecture 100 may include a client 110, a network 120, and a server 130. The client 110 may be carried in various terminal devices such as a smartphone, a smart robot, a smart box, a tablet computer, a laptop computer, and a desktop computer. The server 130 may be an independent physical server, may be a server cluster or a distributed system formed by multiple physical servers, or may be a cloud server that provides a cloud service. The network 120 may be a communication medium of various connection types capable of providing a communication link between the client 110 and the server 130, for example, a wired communication link or a wireless communication link.

According to an implementation requirement, the technical solution provided in the embodiment of this disclosure may be applied to the client 110, may be applied to the server 130, or may be implemented by the client 110 and the server 130 in cooperation. This is not specifically limited in this application.

For example, various intelligent devices such as an intelligent robot and a smartphone may access, by using a wireless network, a mixed language audio synthesis service provided by the cloud server, such as a Chinese-English mixed voice synthesis service. The client 110 sends a Chinese-English mixed text that needs to be synthesized to the server 130 by using the network 120. After performing voice synthesis, the server 130 may send the corresponding synthesized audio to the client 110 in a streaming form or a whole sentence form. For example, a complete voice synthesis procedure may include:

The client 110 uploads a Chinese-English (or other types of languages) mixed text that needs to be synthesized to the server 130, and after receiving the Chinese-English mixed text, the server 130 performs corresponding regularization processing.

The server 130 inputs the regularized text information into a Chinese-English mixed voice synthesis system, rapidly synthesizes an audio corresponding to the text information by using the Chinese-English mixed voice synthesis system, and completes a post-processing operation such as audio compression.

The server 130 returns the audio to the client 110 in a streaming or whole-sentence manner. After receiving the audio, the client 110 may play a smooth and natural voice for the audio.

In the foregoing voice synthesis process, a delay of a voice synthesis service provided by the server 130 is very small, and the client 110 may basically obtain a return result immediately. A user can hear the required content in a short time, free the eyes, and interact conveniently.

Figure 2:
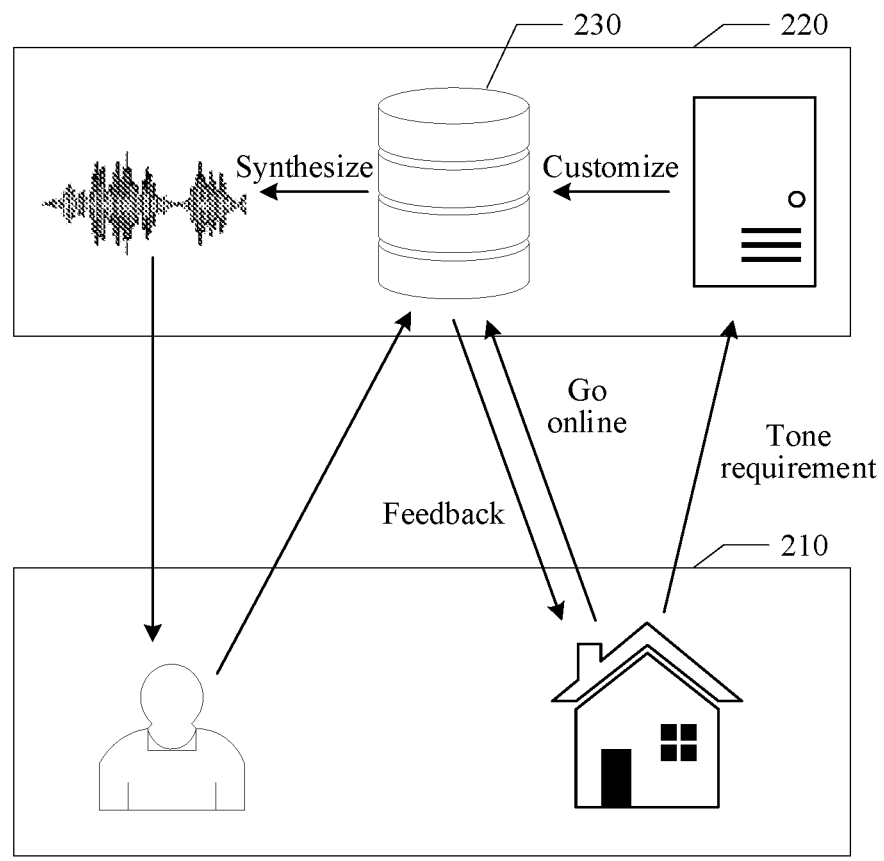
FIG. 2 shows an example system architecture and a customized audio synthesis service procedure of a technical solution of this application in another application scenario.

FIG. 2 shows an example system architecture and a customized audio synthesis service procedure of a technical solution of this application in another application scenario. The architecture and process of the system may be applied to a vertical field in which a dedicated tone voice synthesis service needs to be customized, such as novel reading and news broadcasting.

A process of implementing the customized audio synthesis service in the system architecture may include:

A front-end demand side 210 submits a tone requirement list of a voice synthesis service required by the product, such as the speaker's gender and tone type.

After receiving the tone requirement list, a back-end server 220 collects a corresponding tone according to the required tone, constructs an audio database, and trains a corresponding audio synthesis model 230.

The back-end server 220 synthesizes samples by using the audio synthesis model 230. The customized audio synthesis model 230 may be deployed online after the samples are delivered to the front-end demand side 210 for verification.

An application program (such as a read APP or a news client/APP) of the front-end demand side 210 sends a text that needs to be synthesized into an audio to the audio synthesis model 230 deployed on the back-end server 220. A user of the front-end demand side 210 may hear text content read by using a corresponding customized tone in the application program. A specific audio synthesis procedure is the same as an online synthesis service used in the system architecture shown in FIG. 1.

In this application scenario, after the front-end demand side 210 provides the requirement, the back-end server 220 only needs to collect an audio database of a language type (for example, Chinese) that meets the requirement, and, with reference to an audio database of another language type (for example, English) of another speaker, perform customization training of the audio synthesis model 230 in which language mixing is performed, so as to finally meet a tone required by the front-end demand side 210 to perform language mixing audio synthesis. In this way, costs of customizing an audio synthesis service are greatly reduced.

The following describes in detail the technical solutions provided in this application with reference to specific implementations.

Figure 3:
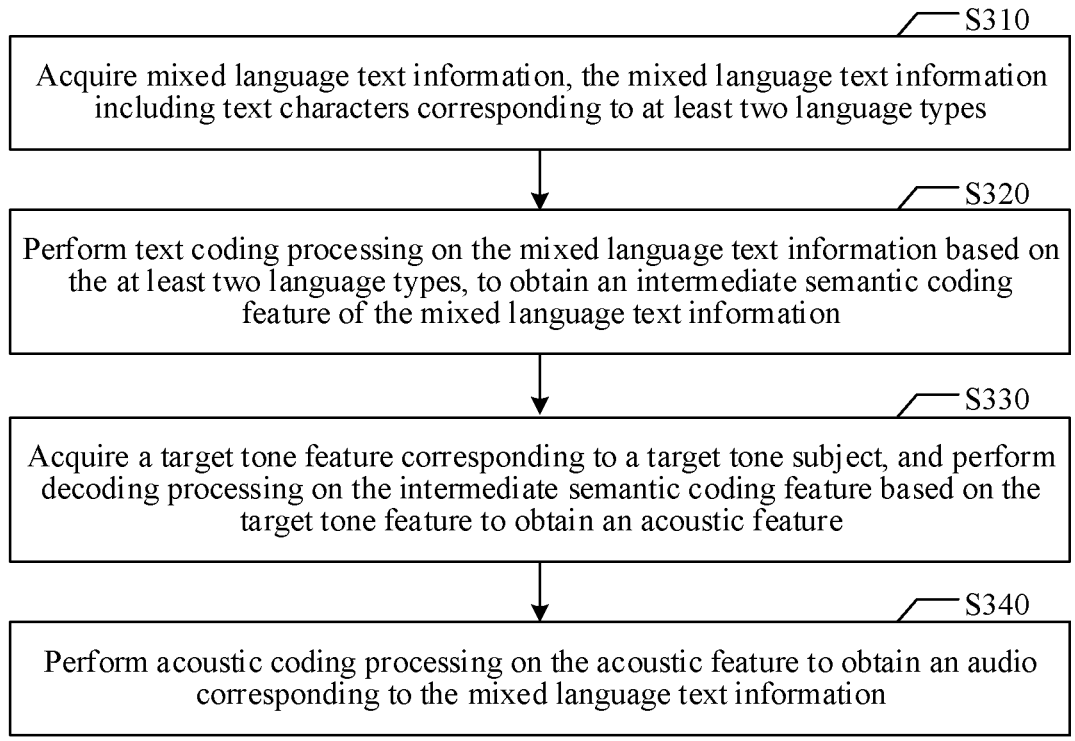
FIG. 3 is a flowchart of an example audio synthesis method according to an embodiment of this disclosure.

FIG. 3 is a step flowchart of an audio synthesis method according to an embodiment of this disclosure. The audio synthesis method may be performed by an electronic device. The electronic device may be a terminal device such as a smartphone and a smart box that carry a client, or may be a server device such as a physical server and a cloud server. As shown in FIG. 3, the audio synthesis method mainly includes step S310 to step S340.

Step S310. Acquire mixed language text information, the mixed language text information including text characters corresponding to at least two language types, (e.g., Chinese and English).

The mixed language text information includes any quantity of text characters, each of which may correspond to at least two different language types. For example, the mixed language text information may be a text including a mixture of a Chinese character and an English character.

In this step, the mixed language text information entered by a user by using an input device may be acquired in a real-time receiving manner, or the mixed language text information may be extracted, in an item-by-item collecting manner, from a file including the text information sentence by sentence or paragraph by paragraph.

In addition, in this step, speech recognition may be performed on the voice information that is entered by the user and that includes two or more different language types, and mixed language text information that includes at least two language types is obtained based on a speech recognition result. For example, in this step, speech recognition processing may be performed on received voice information that includes at least two language types by using a pre-trained speech recognition model, to obtain corresponding mixed language text information, and then audio synthesis is performed on the mixed language text information by performing subsequent steps, so as to achieve an overall tone transform effect, thereby implementing tone-unified voice change processing on one or more speakers.

Step S320. Perform text coding processing on the mixed language text information based on the at least two language types, to obtain an intermediate semantic coding feature of the mixed language text information.

In this step, text coding processing may be performed on the mixed language text information by using a pre-trained encoder, to obtain an intermediate semantic coding feature related to a natural semantic of the mixed language text information. A quantity and a type of the encoder may be in a one-to-one correspondence with a language type included in the mixed language text information. For example, the mixed language text information includes both a Chinese character and an English character. In this step, text coding processing may be performed on the mixed language text information by using Chinese and English encoders, to obtain an intermediate semantic coding feature. In a subsequent step, decoding processing may be performed on the intermediate semantic coding feature by using a decoder corresponding to the encoder, so as to eventually form a natural language that can be understood by a user and has an audio form.

The encoder may be a model trained based on various types of neural networks such as convolutional neural network (CNN), recurrent neural network (RNN), long short-term memory (LSTM), or gate recurrent unit (GRU). The CNN is a feedforward neural network whose neurons can respond to units in a receptive field. The CNN usually includes multiple convolutional layers and a fully-connected layer at the top, and reduces a parameter amount of the model by sharing parameters, so that it is widely used in image and speech recognition. The RNN is a recursive neural network whose input is sequence data and recursion is performed in the evolution direction of the sequence and all nodes (recurrent units) are linked in a chain manner. The LSTM is a recurrent neural network. It adds a unit to the algorithm to judge whether information is useful or not. An input gate, a forget gate, and an output gate are placed in the unit. After the information enters the LSTM, it is determined whether it is useful according to the rule. The information that meets the algorithm authentication is left. The information that does not comply with the algorithm is forgotten. The LSTM is suitable for processing and predicting important events with relatively long intervals and delays in time series. The GRU is a kind of recurrent neural network. Like the LSTM, the GRU is also proposed to solve problems such as long-term memory and gradient in backpropagation. Compared with the LSTM, the GRU has less gate control and fewer parameters than the LSTM. In most cases, the GRU can achieve the same effect as the LSTM and effectively reduce the calculation time.

Step S330. Acquire a target tone feature corresponding to a target tone subject, and perform decoding processing on the intermediate semantic coding feature based on the target tone feature to obtain an acoustic feature.

The target tone subject is a subject object used for determining a synthesized audio tone feature, and the subject object may be a speaker corresponding to an audio database in which a sound sample is stored. In some embodiments, the target tone subject may include a real entity object, for example, a real person such as an anchor or a dubber that has an obvious and unique tone feature. The target tone subject may alternatively include a virtual object that is simulated and synthesized by a computer. For example, the target tone subject may be a virtual character such as Hatsune Miku or a Luo Tianyi generated by using voice synthesis software such as VOCALOID.

In this step, a tone feature required by a user may be obtained in advance, for example, a male voice or an emotional voice, and then a target tone subject that meets the tone feature may be selected. For a determined target tone subject, a target tone feature that can reflect and identify a tone feature of the target tone subject may be obtained in a manner such as feature extraction or mapping. Then, based on the target tone feature, decoding processing may be performed, by using a pre-trained decoder, on the intermediate semantic coding feature obtained in step S320, to obtain a corresponding acoustic feature.

The acoustic feature may be, for example, a feature that is presented by spectrograms or in another form and that has a tone feature and voice content. The spectrograms are a representation manner of a time-domain signal in a frequency domain, and may be obtained by performing Fourier transform on a voice signal. A result obtained is two types of images whose vertical axis is amplitude and phase and horizontal axis is frequency. In an application of the voice synthesis technology, phase information is mostly omitted, and only amplitude information corresponding to different frequencies is reserved.

Step S340. Perform acoustic coding processing on the acoustic feature to obtain an audio corresponding to the mixed language text information.

In this step, the acoustic feature may be inputted to a vocoder, and transform processing is performed on the acoustic feature by using the vocoder, to form an audio that can be outputted and played by using an audio output device such as a speaker. The vocoder is derived from an abbreviation of a voice encoder, and is also referred to as a voice signal analysis and synthesis system. The vocoder functions to transform an acoustic feature into a voice.

In the audio synthesis method provided in this embodiment of this disclosure, coding processing is performed on mixed language text information by using encoders corresponding to multiple language types, and then decoding processing is performed on coding features by using decoders that combine a tone feature of a target tone subject, so as to implement transform to generate audio information corresponding to a single tone and multiple language types. This solves a problem of tone jump due to a language difference in an existing mixed language audio synthesis technology, and can stably output a natural, smooth and tone-unified mixed language audio. The embodiment of this disclosure may be deployed in the cloud to provide a common audio synthesis service for various devices, or may be customized according to different application requirements. Single language audio databases of different target tone subjects may be used for implementing mixed synthesis of audios of multiple language types, thereby greatly reducing costs of training data collection. In addition, the embodiments of this disclosure can be compatible with a recorded single language audio database, so that available tones are more abundant.

Figure 4:
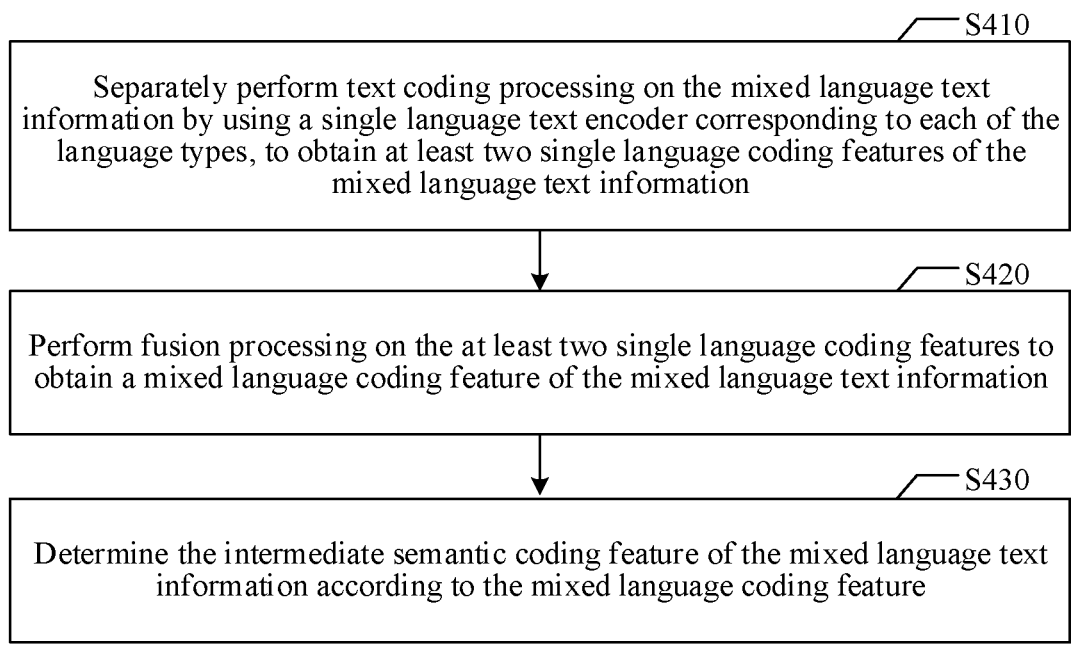
FIG. 4 is a flowchart of steps of a method for performing coding processing by using multiple encoders according to an embodiment of this disclosure.
Figure 5:
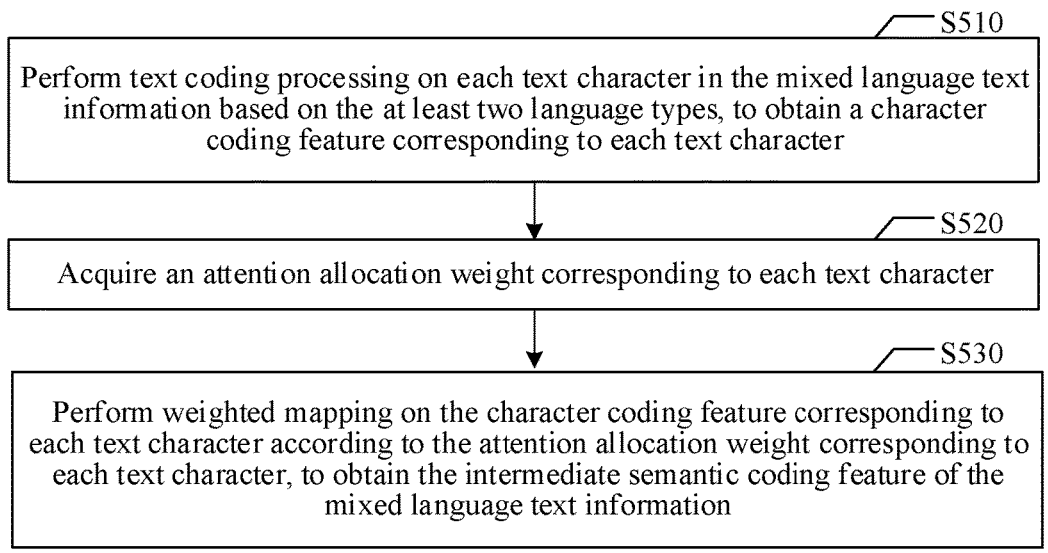
FIG. 5 is a flowchart of steps of a method for performing coding processing based on an attention mechanism according to an embodiment of this disclosure.

The following describes in detail implementations of some steps in the foregoing embodiments with reference to FIG. 4 and FIG. 5.

FIG. 4 is a flowchart of steps of a method for performing coding processing by using multiple encoders according to an embodiment of this disclosure. As shown in FIG. 4, based on the foregoing embodiment, step S320 that perform text coding processing on the mixed language text information based on the at least two language types, to obtain an intermediate semantic coding feature of the mixed language text information may include the following step S410 to step S430:

Step S410. Separately perform text coding processing on the mixed language text information by using a single language text encoder corresponding to each of the language types, to obtain at least two single language coding features of the mixed language text information. Each single language text encoder corresponds to a certain language type.

In this step, mapping transform may be performed on the mixed language text information in advance to form a vector feature that can be identified by an encoder. The mapping transform manner may be, for example, performing mapping transform processing on the mixed language text information by using a character embedding matrix corresponding to each of the language types, to obtain at least two embedded character features of the mixed language text information. That is, each embedded character feature may correspond to a certain language type. A quantity and a type of the character embedding matrix may be in a one-to-one correspondence with a language type. For example, the mixed language text information includes both a Chinese character and an English character. In this step, mapping transform processing may be performed on the mixed language text information by using a character embedding matrix corresponding to the Chinese character, to obtain an embedded character feature corresponding to the Chinese character, and mapping transform processing may be performed on the mixed language text information by using a character embedding matrix corresponding to the English character, to obtain an embedded character feature corresponding to the English character. The character embedding matrix may first perform linear mapping on the mixed language text information, and then perform non-linear transform on the linear mapping result by using an activation function or in another manner to obtain a corresponding embedded character feature.

Several language types are included in the mixed language text information, so that several corresponding single language text encoders can be used in this step. Coding processing is separately performed on the embedded character features by using the single language text encoder corresponding to each of the language types, to obtain at least two single language coding features of the mixed language text information. For example, the mixed language text information includes both a Chinese character and an English character. After an embedded character feature corresponding to a Chinese character is obtained, coding processing may be performed on the embedded character feature by using a single language text encoder corresponding to the Chinese language, to obtain a single language coding feature corresponding to the Chinese language, and after an embedded character feature corresponding to an English character is obtained, coding processing may be performed on the embedded character feature by using a single language text encoder corresponding to the English language, to obtain a single language coding feature corresponding to the English language.

The single language text encoder used in the embodiment of this disclosure may be an encoder with a residual network structure. A feature of the residual network is easy to optimize, and accuracy can be improved by increasing a corresponding depth. On this basis, residual coding may be separately performed on the embedded character features by using the single language text encoder corresponding to each of the language types, to obtain at least two residual coding features of the mixed language text information; and then, fusion processing is separately performed on the embedded character features and each residual coding feature to obtain at least two single language coding features of the mixed language text information.

The residual coding feature is a part of a difference between input data and output data of the encoder, and a single language coding feature can be obtained by combining the residual coding feature with the inputted embedded character feature. A fusion manner herein may be directly adding the residual coding feature and the embedded character feature. A coding scheme of the residual network structure is more sensitive to a data change of code output data. In a training process, a data change of code output data has a greater adjustment effect on a network weight, and therefore a better training effect can be obtained.

Step S420. Perform fusion processing on the at least two single language coding features to obtain a mixed language coding feature of the mixed language text information.

The mixed language coding feature of the mixed language text information may be obtained in a fusion processing manner according to the single language coding feature outputted by each single language text encoder. For example, for two single language coding features, vector calculation may be performed, for example, a mixed language coding feature is obtained in a direct addition manner. In addition, concatenation processing may alternatively be performed on the two single language coding features, and then mapping processing is performed, by using a fully-connected layer or another network structure, on the features obtained by the concatenation processing to obtain the mixed language coding feature. This is not specifically limited in the embodiments of this disclosure.

In some embodiments of this disclosure, fusion processing may be separately performed on each residual coding feature and the embedded character feature in single language text encoders corresponding to different language types based on the residual network structure, to obtain single language coding features, and then fusion processing is performed on the single language coding features to obtain the mixed language coding feature of the mixed language text information.

In some other embodiments of this disclosure, the residual coding feature may be obtained by performing residual coding on only each embedded character feature in single language encoders corresponding to different language types based on the residual network structure, that is, the residual coding feature is directly used as a single language coding feature outputted by each single language text encoder, and then fusion processing is performed on each single language coding feature and the embedded character feature to obtain the mixed language coding feature of the mixed language text information. In this processing manner, compared with the previous embodiment, one time of fusion processing may be reduced, so that calculation efficiency can be improved, and calculation costs can be reduced.

Step S430. Determine the intermediate semantic coding feature of the mixed language text information according to the mixed language coding feature.

In some embodiments of this disclosure, the mixed language coding feature may be directly determined as the intermediate semantic coding feature of the mixed language text information, or the intermediate semantic coding feature may be obtained by performing transform processing on the mixed language coding feature by using a preset function.

In other embodiments of this disclosure, identification information of the language type may be embedded in the mixed language text information to obtain the intermediate semantic coding feature of the mixed language text information.

For example, in this step, mapping transform processing may be performed on the mixed language text information based on language embedding matrices of the at least two language types, to obtain an embedded language feature of the mixed language text information; and then, fusion processing is performed on the mixed language coding feature and the embedded language feature to obtain the intermediate semantic coding feature of the mixed language text information.

Performing mapping transform processing on the mixed language text information by using the language embedding matrix may be performing linear mapping on the mixed language text information according to a matrix parameter preset in the language embedding matrix, and then performing non-linear transform on a linear mapping result by using an activation function or in another manner, to obtain a corresponding embedded language feature. For example, the mixed language text information is a character sequence with a specific character quantity. An embedded language feature obtained after mapping transform is performed on the mixed language text information may be a feature vector that has the same sequence length as the character sequence, and each element in the feature vector is corresponding to a language type corresponding to each character in the character sequence.

Performing fusion processing on the mixed language coding feature and the embedded language feature may be performing vector calculation on the mixed language coding feature and the embedded language feature, for example, obtaining the intermediate semantic coding feature of the mixed language text information in a direct addition manner. In addition, concatenation processing may alternatively be performed on the mixed language coding feature and the embedded language feature, and then mapping processing is performed on a concatenation processing result by using a fully-connected layer or another network structure to obtain the intermediate semantic coding feature of the mixed language text information.

By performing step S410 to step S430, independent coding of the mixed language text information may be implemented by using a single language text encoder corresponding to each language type and a mutually independent symbol set of different languages, and the intermediate semantic coding feature that includes language type information is obtained after fusion processing.

FIG. 5 is a flowchart of steps of a method for performing coding processing based on an attention mechanism according to an embodiment of this disclosure. As shown in FIG. 5, based on the foregoing embodiments, step S320 that perform text coding processing on the mixed language text information based on the at least two language types, to obtain an intermediate semantic coding feature of the mixed language text information may include the following step S510 to step S530:

Step S510. Perform text coding processing on each text character in the mixed language text information based on the at least two language types, to obtain a character coding feature corresponding to each text character.

The mixed language text information is a character sequence including multiple text characters (of different language types). When text coding processing is performed on the mixed language text information by using the coding method provided in the foregoing embodiments, coding processing may be performed on each text character in sequence, to obtain a character coding feature corresponding to each text character.

Step S520. Acquire an attention allocation weight corresponding to each text character.

In addition to a character semantic difference, there are factors that affect semantic coding and decoding in other aspects of each text character in the mixed language text information. Therefore, in this step, the attention allocation weight corresponding to each text character may be determined according to impact factors of different dimensions.

Step S530. Perform weighted mapping on the character coding feature corresponding to each text character according to the attention allocation weight corresponding to each text character, to obtain the intermediate semantic coding feature of the mixed language text information.

A size of the attention allocation weight determines semantic importance of each text character in a coding and decoding process. Therefore, a character coding feature of each text character is weighted and mapped according to the attention allocation weight, thereby improving a semantic expression capability of the obtained intermediate semantic coding feature.

In some embodiments of this disclosure, an attention dimension may be sequence location information of each text character in the mixed language text information. For example, in this embodiment of this disclosure, sequence location information of each text character in the mixed language text information may be first obtained, and then a location attention allocation weight corresponding to each text character is determined according to the sequence location information.

Based on this, the embodiment of this disclosure may further acquire language type information of each text character, then determine, according to the language type information, a language attention allocation weight corresponding to each text character, and further determine, according to the location attention allocation weight and the language attention allocation weight, a multi-attention allocation weight corresponding to each text character.

Based on this, the embodiment of this disclosure may further acquire tone identification information of a target tone subject corresponding to each text character, then determine, according to the tone identification information, a tone attention allocation weight corresponding to each text character, and further determine, according to the location attention allocation weight, the language attention allocation weight, and the tone attention allocation weight, a multi-attention allocation weight corresponding to each text character.

By performing step S510 to step S530, an attention-based coding effect can be implemented. In particular, by using a multiple-attention mechanism, multiple different impact factors can be introduced into the coding process of the mixed language text information, thereby improving a semantic expression capability of a coding result.

In step S330, acquire a target tone feature corresponding to a target tone subject, and perform decoding processing on the intermediate semantic coding feature based on the target tone feature to obtain an acoustic feature.

In this step, an audio database corresponding to different tone subjects may be preconfigured, and corresponding tone identification information may be allocated to different tone subjects through numbering. In this step, the tone identification information of the target tone subject may be first obtained, and then the tone identification information is mapped and transformed by using the tone embedding matrix to obtain the target tone feature of the target tone subject. Then, the target tone feature and the intermediate semantic coding feature may be jointly inputted into a decoder, and after the decoder performs decoding processing, an acoustic feature with the tone feature of the target tone subject is obtained.

When decoding processing is performed by using the decoder, a multi-attention mechanism similar to that of the encoder in the foregoing embodiment may be used. For example, in step S320 and step S330, an RNN network structure based on the attention mechanism may be used as an encoder-decoder model to implement codec processing on the mixed language text information; in addition, a transformer may be used as an encoder-decoder model to perform codec processing. The transformer model is a network structure based on a full attention mechanism, and a parallel capability of the model may be improved.

Step S340. After acoustic coding processing is performed on the acoustic feature to obtain an audio corresponding to the mixed language text information, the embodiment of this disclosure may further acquire a tone transform model by training a tone data sample of the target tone subject, and then perform tone transform processing on the audio by using the tone transform model to obtain an audio corresponding to the target tone subject.

By training the tone transform model and performing tone transform on the outputted audio by using the tone transform model, the audio tone of the mixed language can be more unified without increasing data collection costs.

Figure 6:
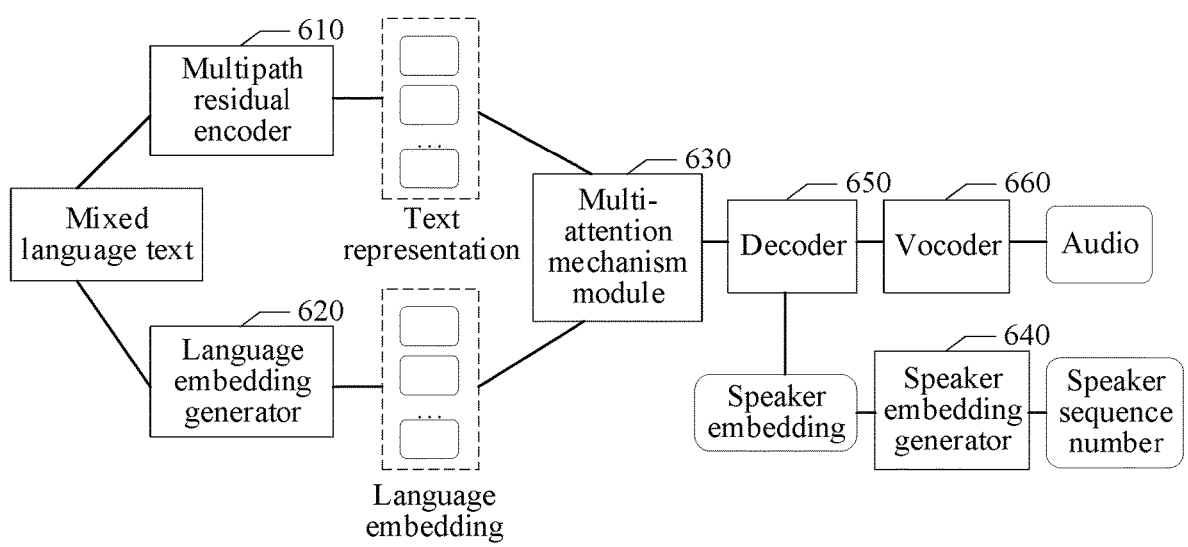
FIG. 6 is a schematic principle diagram of implementing audio information synthesis on a Chinese-English mixed text according to an embodiment of this disclosure.

FIG. 6 is a schematic principle diagram of implementing audio synthesis on a Chinese-English mixed text according to an embodiment of this disclosure. As shown in FIG. 6, an overall system for implementing audio synthesis may mainly include four parts: a multipath residual encoder 610, a language embedding generator 620, a multiple-attention mechanism module 630, and a speaker embedding generator 640, and further include a decoder 650, a vocoder 660, and the like. In this disclosure, a unit and a module may be hardware such as a combination of electronic circuitries; firmware; or software such as computer instructions. The unit and the module may also be any combination of hardware, firmware, and software. In some implementation, a unit may include at least one module.

The multipath residual encoder 610 (Multipath-Res-Encoder) may perform residual coding on an inputted mixed language text by using a Chinese-English two-path encoder, and add a coding result to the inputted mixed language text to obtain a text encode representation, so as to enhance distinguishability of the text encode representation and reduce separation at the boundary of the Chinese-English languages.

The language embedding generator 620 may perform, by using language embedding, mapping and non-linear transform on a category to which each character in the inputted mixed language text belongs, to obtain language embedding. In this way, each character inputted is marked with corresponding language embedding, which is combined with the text encode representation, thereby further enhancing distinguishability of an output result of the encoder.

The multi-attention mechanism module 630 considers the language embedding in addition to the text encode representation. The attention mechanism serves as a bridge to connect the multipath residual encoder 610 and the decoder 650 to accurately determine which location of the code in each decoding moment plays a decisive role in final synthesis quality. The multi-attention mechanism not only considers the text encode representation, but also has a clear understanding of the current content that needs to be decoded. At the same time, the language embedding is also considered, and a language in which currently decoded content belongs is clearly identified. The combination of the two can make decoding more stable and smooth.

The speaker embedding generator 640 obtains speaker embedding information by performing mapping and non-linear transform on speaker sequence numbers to which different audio databases belong, and participates in each decoding moment. Because the decoder 650 functions to transform the text encode representation into an acoustic feature, it plays a key role in the tone of a final synthesized audio. The speaker embedding is introduced into each decoding moment can effectively control an audio feature attribute outputted by the decoder 650, thereby controlling the tone of the final synthesized audio to correspond to the tone of the speaker.

After voice coding is performed by the vocoder 660 on the acoustic feature outputted by the decoder 650, a mixed audio in Chinese and English corresponding to the mixed language text may be obtained. The system includes the benefits of end-to-end learning, and ensures that the synthesized Chinese-English mixed audio is natural, smooth and consistent in tone by designing a refined model encoder and decoder.

Although the steps of the method in this application are described in a specific order in the accompanying drawings, this does not require or imply that the steps have to be performed in the specific order, or all the steps shown have to be performed to achieve an expected result. Additionally or alternatively, some steps may be omitted, a plurality of steps are combined into one step, and/or one step is decomposed into a plurality of steps for execution, and the like.

Figure 7:
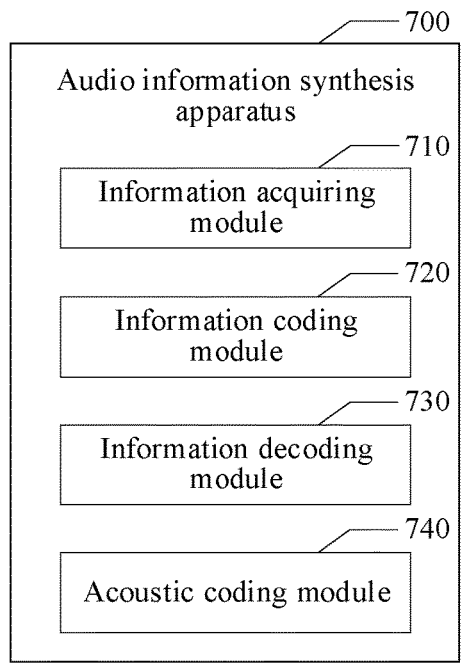
FIG. 7 is a composition block diagram of an example audio synthesis apparatus according to an embodiment of this disclosure.

The following describes the apparatus embodiments of this disclosure, which may be configured to perform the audio synthesis method in the foregoing embodiments of this disclosure. FIG. 7 is a composition block diagram of an audio synthesis apparatus according to an embodiment of this disclosure. As shown in FIG. 7, the audio synthesis apparatus 700 may include:

an information acquiring module 710, configured to acquire mixed language text information, the mixed language text information including text characters corresponding to at least two language types;

an information coding module 720, configured to perform text coding processing on the mixed language text information based on the at least two language types, to obtain an intermediate semantic coding feature of the mixed language text information;

an information decoding module 730, configured to: acquire a target tone feature corresponding to a target tone subject, and perform decoding processing on the intermediate semantic coding feature based on the target tone feature to obtain an acoustic feature; and an acoustic coding module 740, configured to perform acoustic coding processing on the acoustic feature to obtain an audio corresponding to the mixed language text information.

In some embodiments of this disclosure, based on the foregoing embodiments, the information coding module 720 includes:

a single language coding unit, configured to separately perform text coding processing on the mixed language text information by using a single language text encoder corresponding to each of the language types, to obtain at least two single language coding features of the mixed language text information;

a coding feature fusion unit, configured to perform fusion processing on the at least two single language coding features to obtain a mixed language coding feature of the mixed language text information; and a coding feature determining unit, configured to determine the intermediate semantic coding feature of the mixed language text information according to the mixed language coding feature.

In some embodiments of this disclosure, based on the foregoing embodiments, the single language coding unit includes:

a character embedding subunit, configured to separately perform mapping transform processing on the mixed language text information by using a character embedding matrix corresponding to each of the language types, to obtain at least two embedded character features of the mixed language text information; and an embedded coding subunit, configured to separately perform text coding processing on the embedded character features by using the single language text encoder corresponding to each of the language types, to obtain at least two single language coding features of the mixed language text information.

In some embodiments of this disclosure, based on the foregoing embodiments, the embedded coding subunit is specifically configured to:

separately perform residual coding on the embedded character features by using the single language text encoder corresponding to each of the language types, to obtain at least two residual coding features of the mixed language text information; and separately perform fusion processing on the embedded character features and each residual coding feature to obtain at least two single language coding features of the mixed language text information.

In some embodiments of this disclosure, based on the foregoing embodiments, the single language coding feature is a residual coding feature obtained by performing residual coding on the embedded character feature. The coding feature fusion unit includes:

a coding feature fusion subunit, configured to perform fusion processing on the at least two single language coding features and the embedded character features to obtain the mixed language coding feature of the mixed language text information.

In some embodiments of this disclosure, based on the foregoing embodiments, the coding feature determining unit includes:

a language embedding subunit, configured to perform mapping transform processing on the mixed language text information based on language embedding matrices of the at least two language types, to obtain an embedded language feature of the mixed language text information; and a language fusion subunit, configured to perform fusion processing on the mixed language coding feature and the embedded language feature to obtain an intermediate semantic coding feature of the mixed language text information.

In some embodiments of this disclosure, based on the foregoing embodiments, the information coding module 720 includes:

a character coding unit, configured to perform text coding processing on each text character in the mixed language text information based on the at least two language types, to obtain a character coding feature corresponding to each text character;

a weight acquiring unit, configured to acquire an attention allocation weight corresponding to each text character; and a feature weighting unit, configured to perform weighted mapping on the character coding feature of each text character according to the attention allocation weight corresponding to each text character, to obtain the intermediate semantic coding feature of the mixed language text information.

In some embodiments of this disclosure, based on the foregoing embodiments, the weight acquiring unit includes:

a sequence location acquiring subunit, configured to acquire sequence location information of each text character in the mixed language text information; and a first weight determining subunit, configured to determine, according to the sequence location information, a location attention allocation weight corresponding to each text character.

In some embodiments of this disclosure, based on the foregoing embodiments, the weight acquiring unit further includes:

a language type acquiring subunit, configured to acquire language type information of each text character;

a language weight determining subunit, configured to determine, according to the language type information, a language attention allocation weight corresponding to each text character; and a second weight determining subunit, configured to determine, according to the location attention allocation weight and the language attention allocation weight, a multi-attention allocation weight corresponding to each text character.

In some embodiments of this disclosure, based on the foregoing embodiments, the second weight determining subunit is specifically configured to:

acquire tone identification information of a target tone subject corresponding to each text character; and determine, according to the tone identification information, a tone attention allocation weight corresponding to each text character; and determine, according to the location attention allocation weight, the language attention allocation weight, and the tone attention allocation weight, a multi-attention allocation weight corresponding to each text character.

In some embodiments of this disclosure, based on the foregoing embodiments, the information decoding module 730 includes:

a tone identifier acquiring unit, configured to acquire tone identification information of the target tone subject; and a tone identifier embedding unit, configured to perform mapping transform processing on the tone identification information by using a tone embedding matrix, to obtain the target tone feature of the target tone subject.

In some embodiments of this disclosure, based on the foregoing embodiments, the audio synthesis apparatus 700 further includes:

a model acquiring module, configured to acquire a tone transform model by training a tone data sample of the target tone subject; and a tone transform module, configured to perform tone transform processing on the audio information by using the tone transform model, to obtain an audio corresponding to the target tone feature.

Specific details of the audio synthesis apparatus provided in the embodiments of this disclosure have been specifically described in the corresponding embodiment method. Details are not described herein again.

Figure 8:
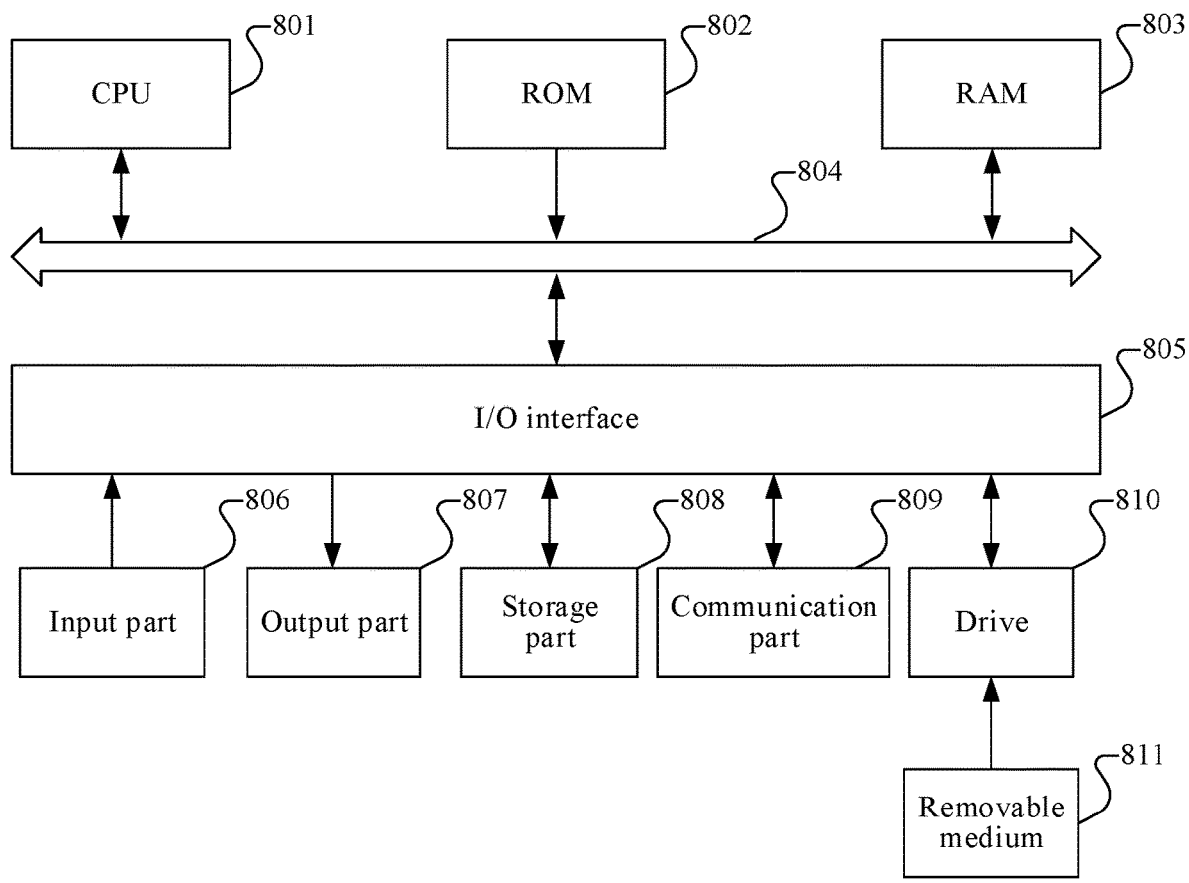
FIG. 8 is a schematic structural diagram of an example computer system adapted to implement an electronic device according to embodiments of this disclosure.

FIG. 8 is a schematic structural diagram of a computer system adapted to implement an electronic device according to embodiments of this disclosure.

the computer system 800 of the electronic device shown in FIG. 8 is merely an example, and does not constitute any limitation on functions and use ranges of the embodiments of this disclosure.

As shown in FIG. 8, the computer system 800 includes a central processing unit (CPU) 801. The CPU 801 may perform various appropriate actions and processing according to a program stored in a read-only memory (ROM) 802 or a program loaded from a storage portion 808 into a random access memory (RAM) 803. The RAM 803 further stores various programs and data required for system operations. The CPU 801, the ROM 802, and the RAM 803 are connected to each other through a bus 804. An input/output (I/O) interface 805 is also connected to the bus 804.

The following components are connected to the I/O interface 805 includes an input part 806 including a keyboard, a mouse, or the like; an output part 807 including a cathode ray tube (CRT), a liquid crystal display (LCD), a speaker, or the like; a storage part 808 including hard disk, or the like; and a communication part 809 including a network interface card such as a local area network (LAN) card, a modem, or the like. The communication portion 809 performs communication processing over a network such as the Internet. A drive 810 is also connected to the I/O interface 805 as required. A removable medium 811, such as a disk, an optical disc, a magneto-optical disc, or a semiconductor memory, is installed on the drive 810 as required, so that a computer program read from the removable medium 811 is installed in the storage portion 808 as required.

Particularly, according to the embodiments of this disclosure, the processes described in various method flowcharts may be implemented as computer software programs. For example, an embodiment of this disclosure includes a computer program product. The computer program product includes a computer program hosted on a computer-readable medium. The computer program includes program code for performing the method shown in the flowchart. In such an embodiment, the computer program may be downloaded and installed from the network through the communication portion 809, and/or installed from the removable medium 811. When the computer program is executed by the CPU 801, the various functions defined in the system of this application are executed.

The computer-readable medium shown in the embodiments of this disclosure may be a computer-readable signal medium or a non-transitory computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

What is claimed is:

1. A method for audio synthesis, performed by an electronic device, comprising:

acquiring mixed language text information, the mixed language text information comprising text characters corresponding to at least two language types;

performing text coding processing on the mixed language text information based on the at least two language types, to obtain an intermediate semantic coding feature of the mixed language text information, including:

performing the text coding processing on each text character in the mixed language text information based on the at least two language types, to obtain a character coding feature corresponding to each text character;

acquiring an attention allocation weight corresponding to the each text character, by:

acquiring sequence location information of the each text character in the mixed language text information;

determining, according to the sequence location information, a location attention allocation weight corresponding to the each text character;

acquiring language type information of each text character;

determining, according to the language type information, a language attention allocation weight corresponding to the each text character; and determining, according to the location attention allocation weight and the language attention allocation weight, a multi-attention allocation weight corresponding to the each text character; and performing weighted mapping on the character coding feature corresponding to the each text character according to the attention allocation weight corresponding to the each text character, to obtain the intermediate semantic coding feature;

acquiring a target tone feature corresponding to a target tone subject, and performing decoding processing on the intermediate semantic coding feature based on the target tone feature to obtain an acoustic feature; and performing acoustic coding processing on the acoustic feature to obtain an audio corresponding to the mixed language text information.

2. The method according to claim 1, wherein performing the text coding processing on the mixed language text information based on the at least two language types, to obtain the intermediate semantic coding feature of the mixed language text information comprises:

separately performing text coding processing on the mixed language text information by using a single language text encoder corresponding to each of the at least two language types, to obtain at least two single language coding features of the mixed language text information respectively corresponding to each of the at least two language types;

performing fusion processing on the at least two single language coding features to obtain a mixed language coding feature of the mixed language text information; and determining the intermediate semantic coding feature according to the mixed language coding feature.

3. The method according to claim 2, wherein separately performing text coding processing on the mixed language text information by using the single language text encoder corresponding to the each of the language types, to obtain the at least two single language coding features of the mixed language text information comprises:

performing mapping transform processing on the mixed language text information by using a character embedding matrix corresponding to the each of the language types, to obtain at least two embedded character features of the mixed language text information; and separately performing text coding processing on each of the at least two embedded character features by using the single language text encoder corresponding to the each of the language types, to obtain the at least two single language coding features of the mixed language text information.

4. The method according to claim 3, wherein separately performing the text coding processing on the each of the embedded character features by using the single language text encoder corresponding to the each of the language types, to obtain the at least two single language coding features of the mixed language text information comprises:

separately performing residual coding on the each of the embedded character features by using the single language text encoder corresponding to the each of the language types, to obtain at least two residual coding features of the mixed language text information; and separately performing fusion processing on the each of the embedded character features and each residual coding feature to obtain the at least two single language coding features of the mixed language text information.

5. The method according to claim 3, wherein each of the at least two single language coding features is a residual coding feature obtained by performing residual coding on each of the at least two embedded character features; and performing the fusion processing on the at least two single language coding features to obtain a mixed language coding feature of the mixed language text information comprises:

performing the fusion processing on the at least two single language coding features and the at least two embedded character features to obtain the mixed language coding feature of the mixed language text information.

6. The method according to claim 2, wherein determining the intermediate semantic coding feature according to the mixed language coding feature comprises:

performing mapping transform processing on the mixed language text information based on language embedding matrices of the at least two language types, to obtain an embedded language feature of the mixed language text information; and performing fusion processing on the mixed language coding feature and the embedded language feature to obtain the intermediate semantic coding feature.

7. The method according to claim 1, wherein determining, according to the location attention allocation weight and the language attention allocation weight, the multi-attention allocation weight corresponding to the each text character comprises:

acquiring tone identification information of the target tone subject corresponding to the each text character; and determining, according to the tone identification information, a tone attention allocation weight corresponding to the each text character; and determining, according to the location attention allocation weight, the language attention allocation weight, and the tone attention allocation weight, the multi-attention allocation weight corresponding to the each text character.

8. The method according to claim 1, wherein acquiring a target tone feature corresponding to the target tone subject comprises:

acquiring tone identification information of the target tone subject; and performing mapping transform processing on the tone identification information by using a tone embedding matrix, to obtain the target tone feature.

9. The method according to claim 1, wherein after performing the acoustic coding processing on the acoustic feature to obtain the audio corresponding to the mixed language text information, the method further comprises:

acquiring a tone transform model by training a tone data sample of the target tone subject; and performing tone transform processing on the audio by using the tone transform model, to obtain the audio corresponding to the target tone subject.

10. A device for audio synthesis, the device comprising a memory for storing computer instructions and a processor in communication with the memory, wherein, when the processor executes the computer instructions, the processor is configured to cause the device to:

acquire mixed language text information, the mixed language text information comprising text characters corresponding to at least two language types;
perform text coding processing on the mixed language text information based on the at least two language types, to obtain an intermediate semantic coding feature of the mixed language text information, including:
performing the text coding processing on each text character in the mixed language text information based on the at least two language types, to obtain a character coding feature corresponding to each text character;
acquiring an attention allocation weight corresponding to the each text character, by:
acquiring sequence location information of the each text character in the mixed language text information;
determining, according to the sequence location information, a location attention allocation weight corresponding to the each text character;
acquiring language type information of each text character;
determining, according to the language type information, a language attention allocation weight corresponding to the each text character; and
determining, according to the location attention allocation weight and the language attention allocation weight, a multi-attention allocation weight corresponding to the each text character; and
performing weighted mapping on the character coding feature corresponding to the each text character according to the attention allocation weight corresponding to the each text character, to obtain the intermediate semantic coding feature;
acquire a target tone feature corresponding to a target tone subject, and performing decoding processing on the intermediate semantic coding feature based on the target tone feature to obtain an acoustic feature; and
perform acoustic coding processing on the acoustic feature to obtain an audio corresponding to the mixed language text information.

11. The device according to claim 10, wherein, when the processor is configured to cause the device to perform the text coding processing on the mixed language text information based on the at least two language types, to obtain the intermediate semantic coding feature of the mixed language text information, the processor is configured to cause the device to:
separately perform text coding processing on the mixed language text information by using a single language text encoder corresponding to each of the at least two language types, to obtain at least two single language coding features of the mixed language text information respectively corresponding to each of the at least two language types;
perform fusion processing on the at least two single language coding features to obtain a mixed language coding feature of the mixed language text information; and
determine the intermediate semantic coding feature according to the mixed language coding feature.

12. The device according to claim 11, wherein, when the processor is configured to cause the device to separately perform text coding processing on the mixed language text information by using the single language text encoder corresponding to the each of the language types, to obtain the at least two single language coding features of the mixed language text information, the processor is configured to cause the device to comprises:
perform mapping transform processing on the mixed language text information by using a character embedding matrix corresponding to the each of the language types, to obtain at least two embedded character features of the mixed language text information; and
separately perform text coding processing on each of the at least two embedded character features by using the single language text encoder corresponding to the each of the language types, to obtain the at least two single language coding features of the mixed language text information.

13. The device according to claim 12, wherein, when the processor is configured to cause the device to separately perform the text coding processing on the each of the embedded character features by using the single language text encoder corresponding to the each of the language types, to obtain the at least two single language coding features of the mixed language text information, the processor is configured to cause the device to:
separately perform residual coding on the each of the embedded character features by using the single language text encoder corresponding to the each of the language types, to obtain at least two residual coding features of the mixed language text information; and
separately perform fusion processing on the each of the embedded character features and each residual coding feature to obtain the at least two single language coding features of the mixed language text information.

14. The device according to claim 12, wherein:
each of the at least two single language coding features is a residual coding feature obtained by performing residual coding on each of the at least two embedded character features; and
when the processor is configured to cause the device to perform the fusion processing on the at least two single language coding features to obtain a mixed language coding feature of the mixed language text information, the processor is configured to cause the device to:
perform the fusion processing on the at least two single language coding features and the at least two embedded character features to obtain the mixed language coding feature of the mixed language text information.

15. The device according to claim 11, wherein, when the processor is configured to cause the device to determine the intermediate semantic coding feature according to the mixed language coding feature, the processor is configured to cause the device to:
perform mapping transform processing on the mixed language text information based on language embedding matrices of the at least two language types, to obtain an embedded language feature of the mixed language text information; and
perform fusion processing on the mixed language coding feature and the embedded language feature to obtain the intermediate semantic coding feature.

16. A non-transitory storage medium for storing computer readable instructions, the computer readable instructions, when executed by a processor, causing the processor to:
acquire mixed language text information, the mixed language text information comprising text characters corresponding to at least two language types;
perform text coding processing on the mixed language text information based on the at least two language types, to obtain an intermediate semantic coding feature of the mixed language text information, including:

performing the text coding processing on each text character in the mixed language text information based on the at least two language types, to obtain a character coding feature corresponding to each text character;

acquiring an attention allocation weight corresponding to the each text character, by:

acquiring sequence location information of the each text character in the mixed language text information;

determining, according to the sequence location information, a location attention allocation weight corresponding to the each text character;

acquiring language type information of each text character;

determining, according to the language type information, a language attention allocation weight corresponding to the each text character; and determining, according to the location attention allocation weight and the language attention allocation weight, a multi-attention allocation weight corresponding to the each text character; and performing weighted mapping on the character coding feature corresponding to the each text character according to the attention allocation weight corresponding to the each text character, to obtain the intermediate semantic coding feature;

acquire a target tone feature corresponding to a target tone subject, and performing decoding processing on the intermediate semantic coding feature based on the target tone feature to obtain an acoustic feature; and perform acoustic coding processing on the acoustic feature to obtain an audio corresponding to the mixed language text information.

* * * * *